United States Patent
Asfahani et al.

(10) Patent No.: US 11,467,039 B2
(45) Date of Patent: Oct. 11, 2022

(54) SYSTEMS AND METHODS FOR REAL-TIME OFFSHORE FLARE MONITORING IN DRILLING SHIPS

(71) Applicant: Saudi Arabian Oil Company, Dhahran (SA)

(72) Inventors: Khaled Asfahani, Khobar (SA); Ali Qasem, Dammam (SA); Adel Al-Ghamdi, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 293 days.

(21) Appl. No.: 16/779,835

(22) Filed: Feb. 3, 2020

(65) Prior Publication Data
US 2021/0239537 A1    Aug. 5, 2021

(51) Int. Cl.
*G01K 1/024* (2021.01)
*E21B 41/00* (2006.01)
(Continued)

(52) U.S. Cl.
CPC .............. *G01K 1/024* (2013.01); *E21B 41/00* (2013.01); *G08B 21/182* (2013.01); *G08B 25/10* (2013.01); *G01S 19/13* (2013.01)

(58) Field of Classification Search
CPC ...... G01K 1/024; E21B 41/00; G08B 21/182; G08B 25/10; G01S 19/13
(Continued)

(56) References Cited

U.S. PATENT DOCUMENTS

| | | | |
|---|---|---|---|
| 4,839,527 A | 6/1989 | Leitch | |
| 4,871,307 A | 10/1989 | Harris et al. | |

(Continued)

FOREIGN PATENT DOCUMENTS

| | | |
|---|---|---|
| CN | 109284709 A | 1/2019 |
| GB | 2519857 A | 5/2015 |

OTHER PUBLICATIONS

Cada, Rich; "Flare and Combustor Gas Measurement: Applications, Regulations and Challenges" A Technical White Paper from Fox Thermal Instruments, Jul. 30, 2014; pp. 1-12.
(Continued)

*Primary Examiner* — Jack K Wang
(74) *Attorney, Agent, or Firm* — Bracewell LLP; Constance G. Rhebergen; Linda L. Morgan (57) ABSTRACT

A system for monitoring flaring activities on a drill ship includes a plurality of devices in wireless communication with each other on the drill ship. Each of the devices includes a resistive temperature detector configured to determine a temperature within a sensing area of the resistive temperature detector, and a communication device operably connected to the resistive temperature detector, wherein the communication device is configured to receive the temperature data from the resistive temperature detector and send the temperature data to a remote system. The device may also include a global positioning system operably connected to the communication device, the global positioning system configured to identify a location of the drill ship in real-time and send the location data to the communication device, wherein the communication device is configured to send the location data to the remote system.

21 Claims, 3 Drawing Sheets

(51) Int. Cl.
*G08B 21/18* (2006.01)
*G08B 25/10* (2006.01)
*G01S 19/13* (2010.01)

(58) Field of Classification Search
USPC .......................................................... 340/984
See application file for complete search history.

(56) References Cited

U.S. PATENT DOCUMENTS

| | | |
|---|---|---|
| 6,999,903 B2 | 2/2006 | Ikeda et al. |
| 8,204,692 B2 | 6/2012 | Arango et al. |
| 8,838,390 B1 | 9/2014 | Selman et al. |
| 9,834,295 B2 | 12/2017 | Cooper et al. |
| 2005/0161260 A1 | 7/2005 | Koithan et al. |
| 2009/0046172 A1 | 2/2009 | Rao et al. |
| 2009/0309028 A1 | 12/2009 | Venkoparao et al. |
| 2010/0132692 A1 | 6/2010 | Shaffer |
| 2011/0024195 A1* | 2/2011 | Hoyer .................. E21B 36/001 166/386 |
| 2014/0231142 A1* | 8/2014 | Poitzsch ................. E21B 47/07 175/50 |
| 2014/0266740 A1 | 9/2014 | Fernandes et al. |
| 2015/0260397 A1 | 9/2015 | Talasila et al. |
| 2016/0223336 A1* | 8/2016 | Robideaux .............. G01S 19/48 |
| 2017/0148184 A1* | 5/2017 | Kraus ..................... G06T 17/00 |
| 2017/0159372 A1* | 6/2017 | Zheng .................. G01S 13/878 |
| 2018/0283148 A1* | 10/2018 | Ortiz ..................... G05B 19/042 |
| 2019/0366400 A1 | 12/2019 | Chambers |
| 2020/0088904 A1* | 3/2020 | Dementyev .......... G01R 33/583 |
| 2020/0318473 A1* | 10/2020 | Jarvis ....................... G01K 7/32 |

OTHER PUBLICATIONS

International Search Report and Written Opinion for International Application No. PCT/US2021/070121, report dated May 21, 2021; pp. 1-15.

Olafsen, Borge et al.; "Thermal flare gas flow meter solves measurement challenges on FPSO vessel" Offshore, Apr. 1, 2020; pp. 1-19.

\* cited by examiner

SYSTEMS AND METHODS FOR REAL-TIME OFFSHORE FLARE MONITORING IN DRILLING SHIPS

BACKGROUND

Field

Embodiments of the present disclosure relate to systems and methods for real-time offshore flare monitoring in drilling ships.

Description of Related Art

Drill ships are special purpose ships which are used for drilling on the ocean beds at deep seas. Such offshore drilling ships, relative to their operational peers have come to be regarded as a safe and sure option for extracting oil and gas at the sea. A drill ship is usually a merchant vessel designed for use in exploratory offshore drilling of new oil and gas wells or for scientific drilling purposes. In most recent years the vessels have been used in deep water and ultra-deep water applications.

A drillship must stay relatively stationary on location in the water for extended periods of time. This positioning may be accomplished with multiple anchors, dynamic propulsion (thrusters), or a combination of these. Drill ships typically carry larger payloads than semisubmersible drilling vessels, but their motion characteristics are usually inferior. The drill ship can also be used as a platform to carry out well maintenance or completion work such as casing and tubing installation, subsea tree installations, and well capping.

Flaring is a process by which excess fluids (gases and in some circumstances liquids) are released and combusted at a flare stack. These excess fluids are derived from multiple sources within commercial and industrial processing facilities, for example, petroleum refineries. Flare sources can be based on process control design in which flaring events are routine and anticipated, and occur for equipment and personal safety. Flare sources can also result from unplanned events such as operational upsets, plant emergencies, equipment failures, plant start-ups, plant shut-downs, inspection activities, human errors and the like. There is considerable motivation to reduce losses in petroleum refinery operations; particularly losses associated with flaring.

Conventional flare systems are limited by their ability to obtain flare measurements that are adequate in the number of sources, of suitable quality, and of useful frequency. This typically leads to inadequate monitoring of flare sources that relies on manual and inaccurate flare estimation methods, for example, John Zink's Flare Estimation Charts based on flame length.

Therefore, there is a significant need to improve flare monitoring systems in commercial and industrial processing facilities. Current flare monitoring systems typically monitor flare conditions via a flowmeter located at the flare. This configuration makes it difficult to determine the source of non-routine flare events, which often have significant impact on plant operations.

Accordingly, it is an object of the present invention to improve flare monitoring systems so as to provide more accurate and useful data as well as minimize the impact of non-routine flare events.

SUMMARY

Accordingly, one example embodiment is a device for monitoring flaring activities on a drill ship. The device includes a resistive temperature detector configured to determine a temperature within a sensing area of the resistive temperature detector, and a communication device operably connected to the resistive temperature detector, wherein the communication device is configured to receive the temperature data from the resistive temperature detector and send the temperature data to a remote system. The device may also include a global positioning system operably connected to the communication device, the global positioning system configured to identify a location of the drill ship in real-time and send the location data to the communication device, wherein the communication device is configured to send the location data to the remote system. The communication device may include a microcontroller and transceiver unit configured to transmit data gathered by the communication device, wherein the resistive temperature detector is operatively coupled to the microcontroller. The device may also include a power storage unit configured to provide power to the resistive temperature detector, the communication device, and the global position system. The microcontroller may be further configured to generate an alarm if the temperature determined by the resistive temperature detector exceeds a predetermined value.

The remote system may include a receiver configured to receive data transmitted by the communication device, one or more processors operably connected to the receiver, and a non-transitory computer readable medium in communication with the one or more processors, the computer readable medium configured to store the temperature data, the location data, and the time data associated with the respective temperature data and location data. The remote system may also include a display device configured to display the temperature data, the location data, and the time data associated with the respective temperature data and location data. The transceiver unit in the communication device may be configured to communicate over a wireless communication method selected from the group consisting of Wi-Fi, Wi-Fi Direct, Bluetooth, Bluetooth Low Energy, ZigBee, 3G, 4G, 4G LTE, 5G, and a cellular network.

Another example embodiment is a system for monitoring flaring activities on a drill ship. The system may include a plurality of devices in wireless communication with each other on the drill ship, each of the devices including a resistive temperature detector configured to determine a temperature within a sensing area of the resistive temperature detector, and a communication device operably connected to the resistive temperature detector, wherein the communication device is configured to receive the temperature data from the resistive temperature detector and send the temperature data to a remote system. The device may also include a global positioning system operably connected to the communication device, the global positioning system configured to identify a location of the drill ship in real-time and send the location data to the communication device, wherein the communication device is configured to send the location data to the remote system.

The remote system may also include a receiver configured to receive data transmitted by the communication device, one or more processors operably connected to the receiver, and a non-transitory computer readable medium in communication with the one or more processors, the computer readable medium configured to store the temperature data, the location data, and the time data associated with the respective temperature data and location data. The remote system may also include a display device configured to display the temperature data, the location data, and the time data associated with the respective temperature data and location data.

Another example embodiment is a method for monitoring flaring activities on a drill ship. The method may include providing a plurality of devices in wireless communication with each other on the drill ship, each of the devices including a resistive temperature detector configured to determine a temperature within a sensing area of the resistive temperature detector, and a communication device operably connected to the resistive temperature detector, wherein the communication device is configured to receive the temperature data from the resistive temperature detector and send the temperature data to a remote system. The devices may also include a global positioning system operably connected to the communication device, the global positioning system configured to identify a location of the drill ship in real-time and send the location data to the communication device, wherein the communication device is configured to send the location data to the remote system. The method may also include receiving, by the remote system, data transmitted by the communication device, and storing the temperature data, the location data, and the time data associated with the respective temperature data and location data in a computer readable medium. The method may further include displaying, on the remote system, the temperature data, the location data, and the time data associated with the respective temperature data and location data. The method may also include generating an alarm, by the remote system, if the temperature determined by the resistive temperature detector exceeds a predetermined value.

BRIEF DESCRIPTION OF DRAWINGS

The foregoing aspects, features, and advantages of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

For simplicity and clarity of illustration, the figures illustrate the general manner of construction, and descriptions and details of well-known features and techniques may be omitted to avoid unnecessarily obscuring the discussion of the described embodiments of the invention. Additionally, elements in the figures are not necessarily drawn to scale. For example, the dimensions of some of the elements in the figures may be exaggerated relative to other elements to help improve understanding of embodiments of the present invention. Like reference numerals refer to like elements throughout the specification.

DETAILED DESCRIPTION

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art.

One objective of the systems disclosed is to detect offshore flaring activities and to record the start time, duration, and end time for such activities in offshore drilling ships and mobile rigs. This would enable any organization to obtain auditable information for further investigation when needed. The system may include a resistive temperature detector (RTD), which can be installed within the vicinity of a flaring boom or within an appropriate distance to detect the flaring heat. The system may also include telemetry system to automate the communication process and to enable the data to be transmitted to a receiving device for real-time monitoring purposes. The system may also include a global positioning system (GPS) to link the flaring activities with the location of ship and to enable obtaining auditable information when needed. The system may also include a database to receive the streaming data and archive it. The system may also have atmospheric and hydrodynamic modeling capabilities where environmental models may be used to backtrack the source of the spill or smoke by utilizing state of the art technologies.

Since the average air temperature rarely exceeds 50° C. worldwide, the system can be customized to generate an alarm when the air temperature exceeds, for example, 75° C. within the RTD vicinity. Therefore, any temperature deviations from the average air temperature will be recorded and the alarm will be set off through the organization system and archived. If an oil spill or unknown source of smoke is detected, the organization can get back to check their record of the flaring activities and link the incident properly with the GPS coordinates. Modeling can also be utilized to backtrack the source of the spill.

Previous attempts have been made worldwide to detect flares using near real-time satellite imagery. However, obtaining satellite imagery is expensive and has some limitations due to weather conditions, for example, cloud cover. This embodiments disclosed provide a reliable and cheap technology that can be instantly installed in every single flare boom within the operated areas.

Figure 1:
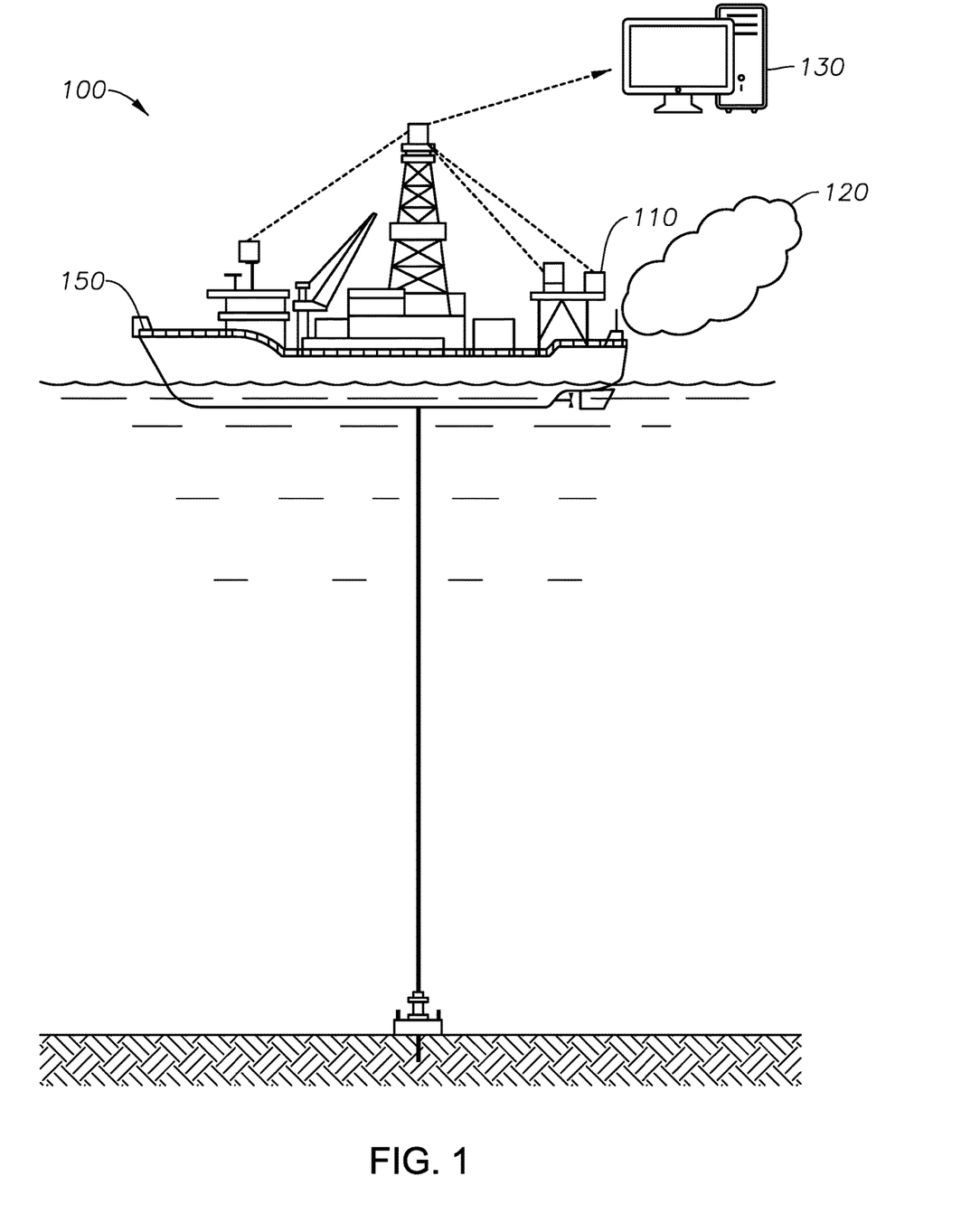
FIG. 1 is a schematic of a system for monitoring flaring activities on a drill ship, according to one or more example embodiments.

Turning now to the figures, FIG. 1 illustrates a system 100 for monitoring flaring activities 120 on a drill ship 150. The system 100 may include a plurality of devices 110 in wireless communication with each other on the drill ship 150. The system 100 may also include a remote system 130 which may be in wireless communication with each of the devices 110 on the drill ship 150.

Figure 2:
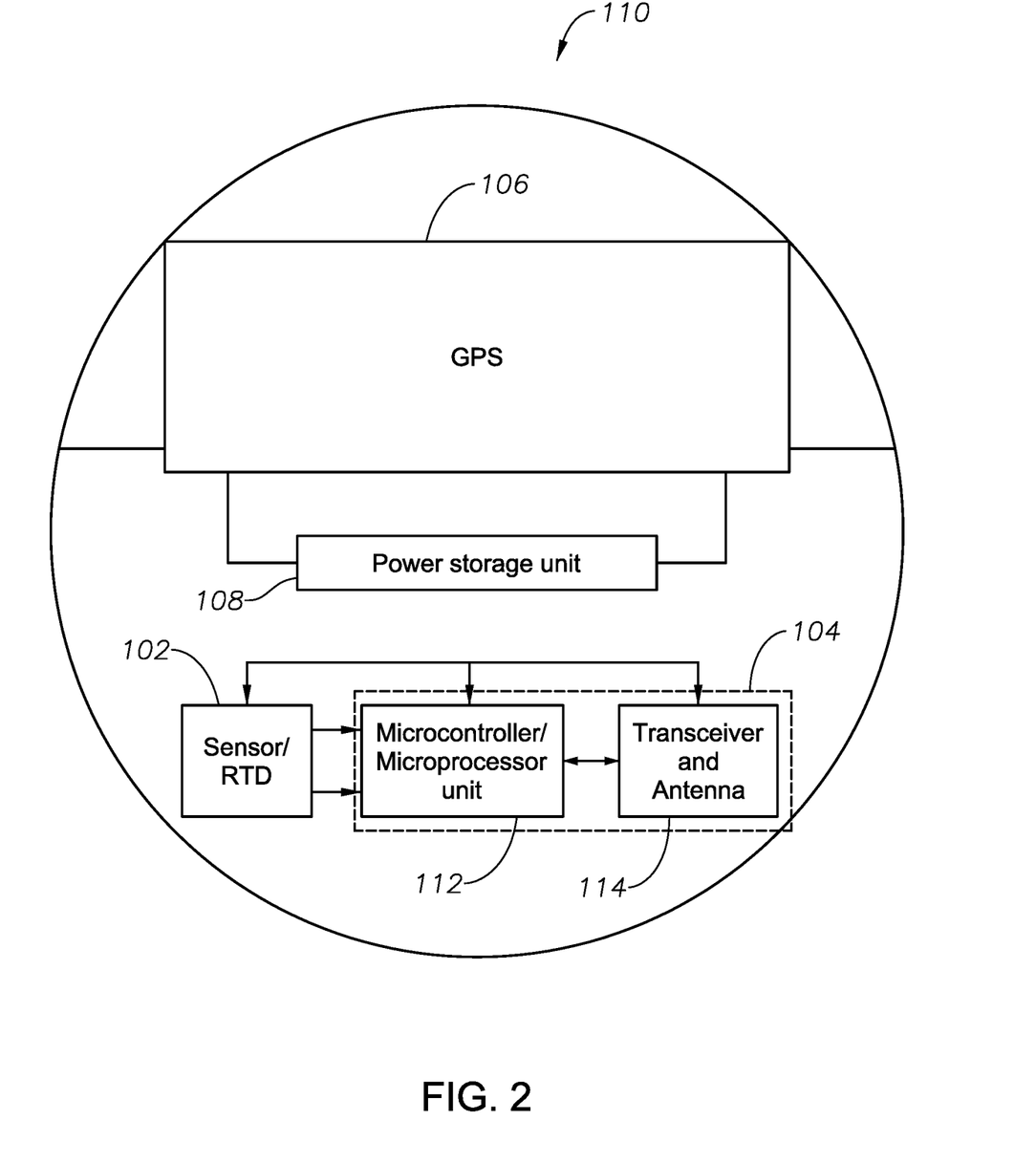
FIG. 2 is a schematic of a device in a system for monitoring flaring activities on a drill ship, according to one or more example embodiments.

FIG. 2 illustrates a schematic view of the device 110 shown in FIG. 1. Each of the devices 110 including a temperature sensor 102, such as a resistive temperature detector (RTD) configured to determine a temperature within a sensing area of the resistive temperature detector. The device 110 also includes a communication device 104 operably connected to the resistive temperature detector 102. The communication device 104 may be configured to receive the temperature data from the resistive temperature detector 102 and send the temperature data to a remote system 130, as shown in FIG. 1 for example. The device 110 may also include a global positioning system (GPS) 106 operably connected to the communication device 104. The global positioning system 106 may be configured to identify a location of the drill ship 150 in real-time and send the location data to the communication device 104. The communication device 104 may be configured to send the location data to the remote system 130.

The communication device 104 may include a microcontroller or microprocessor unit 112 and a transceiver unit 114 configured to transmit data gathered by the communication device 104 using one or more antennas. The resistive temperature detector 102 may be operatively coupled to the microcontroller 112. The device 110 may also include a power storage unit 108 configured to provide power to the resistive temperature detector 102, the communication device 104, and the global position system 106. The microcontroller unit 112 may be further configured to generate an alarm if the temperature determined by the resistive temperature detector 102 exceeds a predetermined value, for example 75 degrees Celsius. The transceiver unit 114 in the communication device 104 may be configured to communicate over a wireless communication method selected from the group consisting of Wi-Fi, Wi-Fi Direct, Bluetooth, Bluetooth Low Energy, ZigBee, 3G, 4G, 4G LTE, 5G, and a cellular network.

The remote system 130 may also include a receiver configured to receive data transmitted by the communication device 104. The remote system 130 may also include one or more processors operably connected to the receiver, and a non-transitory computer readable medium in communication with the one or more processors. The computer readable medium may be configured to store the temperature data, the location data, and the time data associated with the respective temperature data and location data. The remote system 130, which will be described with reference to FIG. 3 in sections below, may also include a display device configured to display the temperature data, the location data, and the time data associated with the respective temperature data and location data.

Another example embodiment is a method for monitoring flaring activities on a drill ship. The method may include providing a plurality of devices in wireless communication with each other on the drill ship, each of the devices including a resistive temperature detector configured to determine a temperature within a sensing area of the resistive temperature detector, and a communication device operably connected to the resistive temperature detector, wherein the communication device is configured to receive the temperature data from the resistive temperature detector and send the temperature data to a remote system. The devices may also include a global positioning system operably connected to the communication device, the global positioning system configured to identify a location of the drill ship in real-time and send the location data to the communication device, wherein the communication device is configured to send the location data to the remote system. The method may also include receiving, by the remote system, data transmitted by the communication device, and storing the temperature data, the location data, and the time data associated with the respective temperature data and location data in a computer readable medium. The method may further include displaying, on the remote system, the temperature data, the location data, and the time data associated with the respective temperature data and location data. The method may also include generating an alarm, by the remote system, if the temperature determined by the resistive temperature detector exceeds a predetermined value.

A flare monitoring system can be run using known software or other suitable real-time data infrastructure and collaboration tool. The entire facility flare system is thus ascertained showing the location of each flare-through element (e.g., control valve, manual valve, restricting orifice, etc.), for all equipment that contribute to both the low pressure, high pressure or acid flare headers from each plant within the facility. If such a schematic is developed in an external graphics application (e.g., Visio), the information can be imported in OSIsoft, LLC's ProcessBook or other suitable real-time data infrastructure and collaboration tool, whereby the Cv Percent Opening can be displayed, e.g., as a horizontal bar graph, and the FV Tag data can be displayed as a numeric value.

Reports can be generated based on the overall network, an individual plant, a selected group of plants within a refinery, or a portion of a plant. The data presented at this level can include, for instance, a chart that presents daily flaring activity for a given refinery in volume, with correlated equivalent in terms of barrels of crude per day, and monetary equivalents. This can be presented as data tables and/or graphs. The data reports can be provided, separately or in conjunction with the above, based on a given source in each plant. The data reports can be provided, separately or in conjunction with the above, based on all of the plants in a given refinery to demonstrate the plant(s) responsible for a majority of flaring events.

The reports of flare data can incorporate certain assumptions including the average heat content of crude oil, the average heat of combustion for pure gases at standard conditions, and the gas monetary value.

Flare sources can be based on process control design in which flaring events are classified as routine or non-routine. Routine flare sources are anticipated and occur for equipment and personal safety, and include, for instance, purging gas to eliminate air from the flare headers, leakage, and normal operation of control valve discharges based on process design considerations. Non-routine flaring events include those resulting from unplanned events such as operational upsets that increase the volume of flare gas produced or decrease the ability of the gas handling system to accommodate it, such as pressure relieve malfunction, equipment overpressure or other cause for relieving relief valves, equipment plugging resulting in local overpressure, loss of a major process unit compressor (e.g., FCC wet gas compressor), loss of fuel gas recovery system compressors, reciprocating compressor seats overheating from high nitrogen or hydrogen content, fuel gas with low specific gravity or high heat of compression resulting in overheating, high inlet temperature to the flare gas compressor, and/or general mechanical problems from the operation of rotating equipment. Non-routine flaring events are also a result of plant emergencies (equipment failures and operational errors that result in equipment overpressure, typically leading to relief valves opening to the flare system, which can be classified as emergencies; emergency flaring events are severe instances of upsets or malfunction and often have the same set of basic causes); mechanical failure (flaring attributed to mechanical equipment or instrumentation failure); startup and shutdown (flaring attributed to startup and shutdown); process/fuel imbalance (flaring resulting from temporary fuel imbalance in the fuel system or inadequate gas processing capacity); and other causes (including instances of flaring not attributable to the above categories such as specific actions by operation staff or any other operational situations to be specified by the facilities).

For each flaring event, classification into one of the above categories or subcategories should be accomplished along with identification of the source, the rate, duration and the reasons of flaring, repetitive flaring from the same plant/ equipment along with the corrective actions to be undertaken to avoid recurrence of such events in future need to specified.

Figure 3:
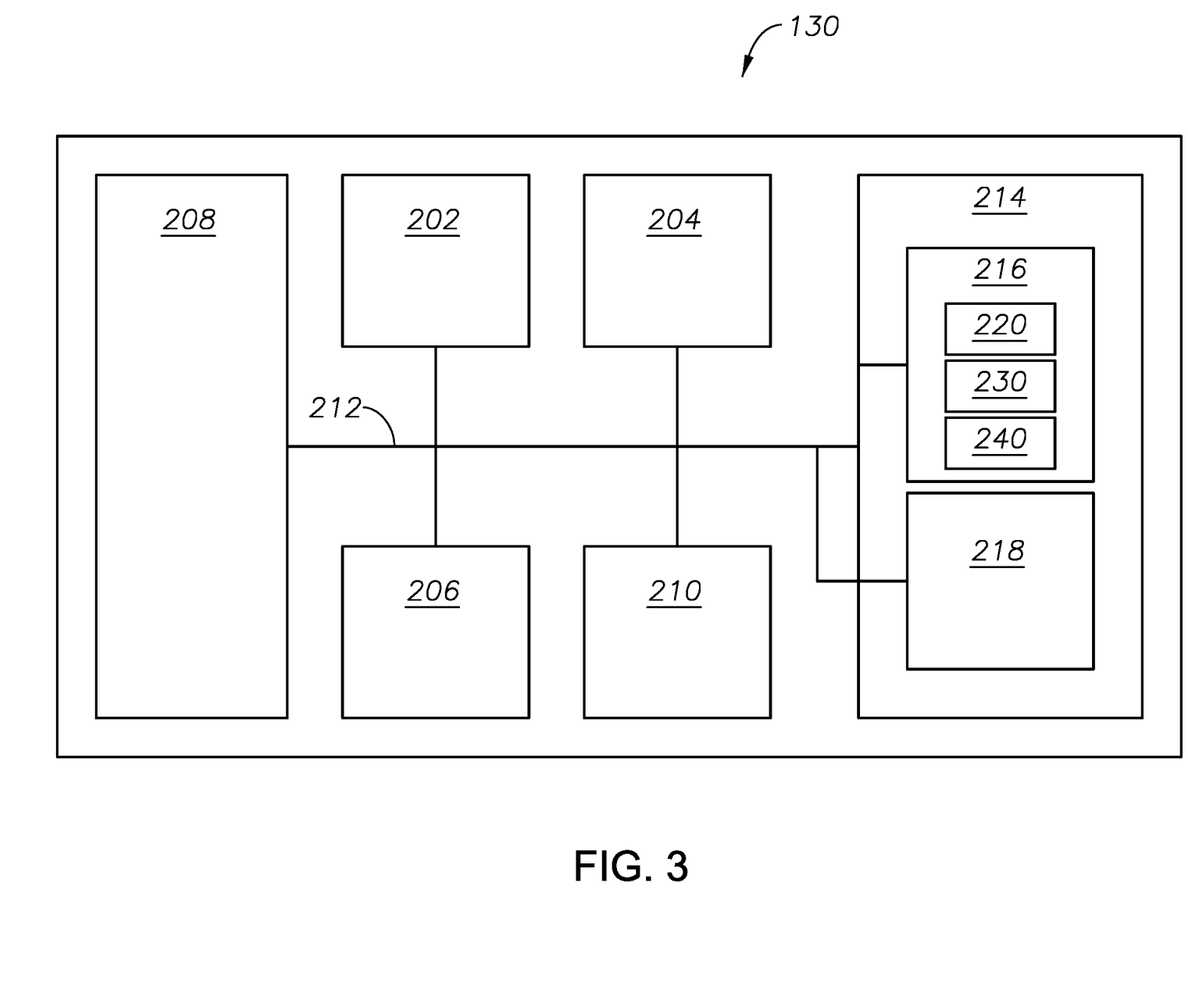
FIG. 3 is a schematic of a remote computer system in a system for monitoring flaring activities on a drill ship, according to one or more example embodiments.

An exemplary block diagram of a remote computer system 130 by which the flare monitoring data modules described herein can be implemented is shown in FIG. 3. Computer system 130 includes a processor 202, such as a central processing unit, an input/output interface 204 and support circuitry 206. In certain embodiments, where the computer system 130 requires a direct human interface, a display 208 and an input device 210 such as a keyboard, mouse or pointer are also provided. The display 208, input device 210, processor 202, and support circuitry 206 are shown connected to a bus 212 which also connects to a memory 214. Memory 214 includes program storage memory 216 and data storage memory 218. Note that while computer 130 is depicted with direct human interface components display 208 and input device 210, programming of modules and exportation of data can alternatively be accomplished over the interface 204, for instance, where the computer 130 is connected to a network and the programming and display operations occur on another associated computer, or via a detachable input device as is known with respect to interfacing programmable logic controllers.

Program storage memory 216 and data storage memory 218 can each comprise volatile (RAM) and non-volatile (ROM) memory units and can also comprise hard disk and backup storage capacity, and both program storage memory 216 and data storage memory 218 can be embodied in a single memory device or separated in plural memory devices. Program storage memory 216 stores software program modules and associated data, and in particular stores one or more of the data historian module 220, computation module 230 and display module 240, or a combination including at least one of the foregoing modules. Data storage memory 218 stores tags and other data generated by the one or more modules of the present invention and event data received by the flare-through elements.

The computing device 130 preferably supports an operating system, for example stored in program storage memory 216 and executed by the processor 202 from volatile memory. It is to be appreciated that the computer system 130 can be any computer such as a personal computer, minicomputer, workstation, mainframe, a dedicated controller such as a programmable logic controller, or a combination thereof. While the computer system 130 is shown, for illustration purposes, as a single computer unit, the system can comprise a group/farm of computers which can be scaled depending on the processing load and database size.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A device for monitoring flaring activities on a drill ship, the device comprising:
    a resistive temperature detector located on the drill ship and configured to determine a temperature within a sensing area of the resistive temperature detector, the resistive temperature detector configured to detect a flaring heat of a flaring activity; and
    a communication device operably connected to the resistive temperature detector, wherein the communication device is configured to receive the temperature data from the resistive temperature detector and to send the temperature data and time data associated with the temperature data, to a remote system; where
    the remote system is operable to record a start time, a duration, and an end time of the flaring activity, and is operable to classify the flaring activity into one of a plurality of categories based on a source of the flaring activity.

2. The device according to claim 1, further comprising:
    a global positioning system operably connected to the communication device, the global positioning system configured to identify a location of the drill ship in real-time and send the location data to the communication device, wherein the communication device is configured to send the location data to the remote system.

3. The device according to claim 2, wherein the communication device further comprises:
    a microcontroller and transceiver unit configured to transmit data gathered by the communication device, wherein the resistive temperature detector is operatively coupled to the microcontroller.

4. The device according to claim 3, further comprising: a power storage unit configured to provide power to the resistive temperature detector, the communication device, and the global position system.

5. The device according to claim 3, wherein the microcontroller is further configured to generate an alarm if the temperature determined by the resistive temperature detector exceeds a predetermined value.

6. The device according to claim 2, wherein the remote system further comprises:
a receiver configured to receive data transmitted by the communication device;
one or more processors operably connected to the receiver; and
a non-transitory computer readable medium in communication with the one or more processors, the computer readable medium configured to store the temperature data, the location data, and the time data associated with the respective temperature data and location data.

7. The device according to claim 3, wherein the remote system further comprises:
a display device configured to display the temperature data, the location data, and the time data associated with the respective temperature data and location data.

8. The device according to claim 3, wherein the transceiver unit is configured to communicate over a wireless communication method selected from the group consisting of Wi-Fi, Wi-Fi Direct, Bluetooth, Bluetooth Low Energy, ZigBee, 3G, 4G, 4G LTE, 5G, and a cellular network.

9. A system for monitoring flaring activities on a drill ship, the system comprising:
a plurality of devices located on the drill ship and in wireless communication with each other on the drill ship, each of the devices comprising:
a resistive temperature detector configured to determine a temperature within a sensing area of the resistive temperature detector, the resistive temperature detector configured to detect a flaring heat of a flaring activity; and
a communication device operably connected to the resistive temperature detector, wherein the communication device is configured to receive the temperature data from the resistive temperature detector and to send the temperature data and time data associated with the temperature data, to a remote system; where the remote system is operable to record a start time, a duration, and an end time of the flaring activity, and is operable to classify the flaring activity into one of a plurality of categories based on a source of the flaring activity.

10. The system according to claim 9, each of the devices further comprise:
a global positioning system operably connected to the communication device, the global positioning system configured to identify a location of the drill ship in real-time and send the location data to the communication device, wherein the communication device is configured to send the location data to the remote system.

11. The system according to claim 10, wherein the communication device further comprises:
a microcontroller and transceiver unit configured to transmit data gathered by the communication device, wherein the resistive temperature detector is operatively coupled to the microcontroller.

12. The system according to claim 11, wherein each of the devices further comprise:
a power storage unit configured to provide power to the resistive temperature detector, the communication device, and the global position system.

13. The system according to claim 11, wherein the microcontroller is further configured to generate an alarm if the temperature determined by the resistive temperature detector exceeds a predetermined value.

14. The system according to claim 9, wherein the remote system further comprises:
a receiver configured to receive data transmitted by the communication device;
one or more processors operably connected to the receiver; and
a non-transitory computer readable medium in communication with the one or more processors, the computer readable medium configured to store the temperature data, the location data, and the time data associated with the respective temperature data and location data.

15. The system according to claim 14, wherein the remote system further comprises:
a display device configured to display the temperature data, the location data, and the time data associated with the respective temperature data and location data.

16. The system according to claim 11, wherein the transceiver unit is configured to communicate over a wireless communication method selected from the group consisting of Wi-Fi, Wi-Fi Direct, Bluetooth, Bluetooth Low Energy, ZigBee, 3G, 4G, 4G LTE, 5G, and a cellular network.

17. A method for monitoring flaring activities on a drill ship, the method comprising:
providing a plurality of devices in wireless communication with each other on the drill ship, each of the devices comprising:
a resistive temperature detector located on the drill ship and configured to determine a temperature within a sensing area of the resistive temperature detector; and
a communication device operably connected to the resistive temperature detector, wherein the communication device is configured to receive the temperature data from the resistive temperature detector and to send the temperature data to a remote system and time data associated with the temperature data;
detecting a flaring head of a flaring activity with the resistive temperature detector; and
recording a start time, a duration, and an end time of the flaring activity, and classifying the flaring activity into one of a plurality of categories based on a source of the flaring activity.

18. The method according to claim 17, wherein each of the devices further comprise:
a global positioning system operably connected to the communication device, the global positioning system configured to identify a location of the drill ship in real-time and send the location data to the communication device, wherein the communication device is configured to send the location data to the remote system.

19. The method according to claim 17, further comprising:
receiving, by the remote system, data transmitted by the communication device; and
storing the temperature data, the location data, and the time data associated with the respective temperature data and location data in a computer readable medium.

20. The method according to claim 17, further comprising:
 displaying, on the remote system, the temperature data, the location data, and the time data associated with the respective temperature data and location data.

21. The method according to claim 17, further comprising:
 generating an alarm, by the remote system, if the temperature determined by the resistive temperature detector exceeds a predetermined value.

* * * * *

UNITED STATES PATENT AND TRADEMARK OFFICE
CERTIFICATE OF CORRECTION

PATENT NO. : 11,467,039 B2  
APPLICATION NO. : 16/779835  
DATED : October 11, 2022  
INVENTOR(S) : Khaled Asfahani Page 1 of 1

It is certified that error appears in the above-identified patent and that said Letters Patent is hereby corrected as shown below:

In the Claims

Column 10, Claim 17, Line 46:
"head"
Should be changed to:
"heat"

Signed and Sealed this
Eighteenth Day of March, 2025

Coke Morgan Stewart
*Acting Director of the United States Patent and Trademark Office*